(12) United States Patent
Renaudin et al.

(10) Patent No.: US 10,315,537 B2
(45) Date of Patent: Jun. 11, 2019

(54) FOLDABLE CHILD CAR SEAT PROVIDED WITH A TOP TETHER STRAP

(71) Applicant: DOREL FRANCE, Cholet (FR)

(72) Inventors: Francois Renaudin, Cholet (FR); Nicolas Garnier, Saint Germain sur Moine (FR)

(73) Assignee: Dorel Juvenile Group, Inc., Foxboro, MA (US)

( * ) Notice: Subject to any disclaimer, the term of this patent is extended or adjusted under 35 U.S.C. 154(b) by 57 days.

(21) Appl. No.: 15/549,267

(22) PCT Filed: Jan. 28, 2016

(86) PCT No.: PCT/EP2016/051847
§ 371 (c)(1),
(2) Date: Aug. 7, 2017

(87) PCT Pub. No.: WO2016/128228
PCT Pub. Date: Aug. 18, 2016

(65) Prior Publication Data
US 2018/0015847 A1 Jan. 18, 2018

(30) Foreign Application Priority Data
Feb. 9, 2015 (FR) ...................................... 15 51024

(51) Int. Cl.
*B60N 2/28* (2006.01)
*B60N 2/90* (2018.01)
(52) U.S. Cl.
CPC ......... *B60N 2/2809* (2013.01); *B60N 2/2851* (2013.01); *B60N 2/2872* (2013.01); *B60N 2/2887* (2013.01); *B60N 2/943* (2018.02); *B60N 2002/2896* (2013.01); *B60N 2002/971* (2018.02)

(58) Field of Classification Search
None
See application file for complete search history.

(56) References Cited

U.S. PATENT DOCUMENTS

| 5,380,060 | A | * | 1/1995 | Sponsler | B60N 2/3011 297/238 |
| 5,383,707 | A | * | 1/1995 | Osenkowski | B60N 2/3084 297/238 |
| 6,619,752 | B1 | | 9/2003 | Glover | |
| 8,419,067 | B2 | | 4/2013 | Glover et al. | |
| 2004/0061366 | A1 | * | 4/2004 | Meeker | B60N 2/2806 297/250.1 |

(Continued)

FOREIGN PATENT DOCUMENTS

| AU | 597097 B2 | 5/1990 |
| EP | 2502780 A1 | 9/2012 |

(Continued)

OTHER PUBLICATIONS

Written Opinion of the International Searching Authority issued in connection with International Application No. PCT/EP2016/051847, dated Apr. 19, 2016, 7 pages.

*Primary Examiner* — David E Allred
(74) *Attorney, Agent, or Firm* — Barnes & Thornburg LLP

(57) ABSTRACT

The present disclosure relates to a child car seat this is tethered to an anchor point in a vehicle. The child car seat includes a seat bottom and a foldable seat back.

11 Claims, 6 Drawing Sheets

(56) References Cited

U.S. PATENT DOCUMENTS

Figure 1:
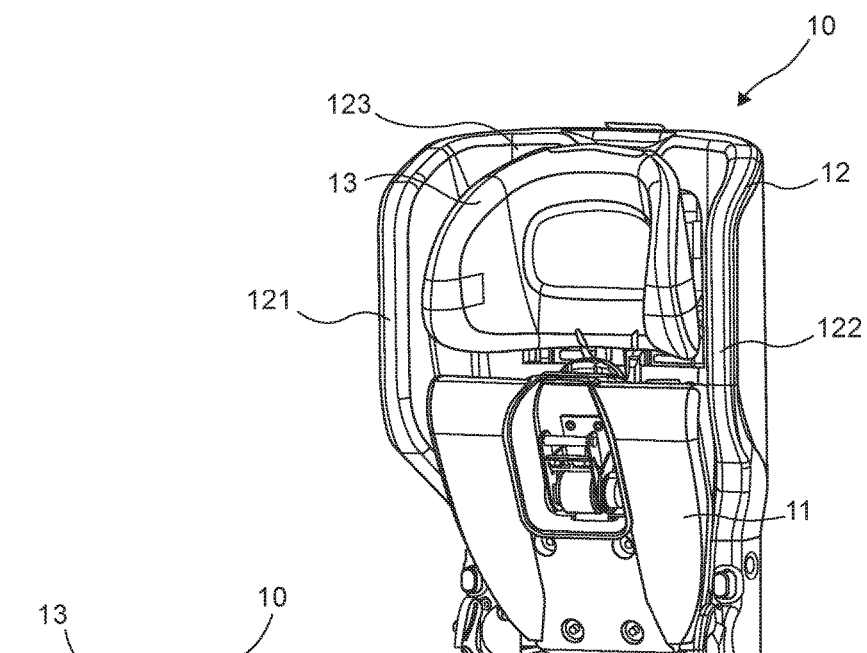

| | | | |
|---|---|---|---|
| 2005/0264059 A1* | 12/2005 | Clement | B60N 2/2806 297/238 |
| 2007/0114774 A1* | 5/2007 | Lang | B60N 2/2806 280/801.1 |
| 2010/0033001 A1* | 2/2010 | Boyer | B60N 2/2806 297/253 |
| 2016/0207497 A1* | 7/2016 | Seal | B60R 22/105 |
| 2016/0304004 A1* | 10/2016 | Sandbothe | A47D 13/00 |
| 2016/0332542 A1* | 11/2016 | Cohen | B60N 2/2887 |

FOREIGN PATENT DOCUMENTS

| | | |
|---|---|---|
| FR | 2978709 A1 | 2/2013 |
| FR | 3005004 A3 | 10/2014 |
| WO | 2011094570 A2 | 8/2011 |

\* cited by examiner

FOLDABLE CHILD CAR SEAT PROVIDED WITH A TOP TETHER STRAP

CROSS-REFERENCE TO RELATED APPLICATIONS

This application is a U.S. national counterpart application of international application serial No. PCT/EP2016/051847 filed Jan. 28, 2016, which claims priority to French Patent Application No. 1551024 filed Feb. 9, 2015.

TECHNICAL FIELD OF THE INVENTION

The field of the invention is that of child care, and more particularly car seats, intended to be installed in a vehicle. More precisely, the invention relates to a foldable child car seat, and in particular its installation in a vehicle.

TECHNOLOGICAL BACKGROUND

In the past, several solutions have been proposed for building foldable car seats. However, none of these solutions is suitable for complying with the safety requirements, in particular defined in the European standards.

Child car seats are generally fastened to the seat of a vehicle through clips of the ISOFIX type, that are attached with rings provided for this purpose in the vehicle. In addition, means allowing countering of a rotation of the seat around the ISOFIX clips must be provided. This can be a supporting leg, or a "top-tether" strap that connects the upper portion of the seat back to a third anchoring point provided in the vehicle.

Implementing such a "top tether" strap is not easy, in the case of a foldable seat. The latter must be light and easy to manipulate, which is hardly compatible with the presence of a reinforced anchoring zone of the strap on the upper portion of the seat back.

As such, a first risk identified is the non-use of the "top-tether" strap during the installation of the car seat in the vehicle. The car seat is then free to pivot around the ISOFIX clips, which represents a danger for the child in case of an impact or an abrupt deceleration in particular.

Moreover, a risk identified is that the "top-tether" strap is not sufficiently tightened. The car seat is then not correctly attached to the vehicle, which can represent a substantial risk for the child, in particular in case of an impact. This risk is even more substantial in the case of a foldable seat, as it should not only be verified that the ISOFIX clips and the top tether strap are correctly installed, but also that this is the case when the seat is unfolded and able to receive the child.

OBJECTIVES OF THE INVENTION

The invention aims to overcome at least some of these disadvantages.

In particular, the invention aims to provide a foldable car seat that is compatible with the current safety requirements.

The invention also aims to provide, in at least one embodiment, a car seat that aims to prevent an incorrect installation (misuse) of the car seat in the vehicle.

DISCLOSURE OF THE INVENTION

These objectives, as well as others which shall appear in what follows, are achieved using a child car seat, comprising a seat bottom and a seat back that can have a folded position, in which said seat bottom is brought back against said seat back, in order to form a compact unit, and an unfolded position, in which a child can be installed in said seat.

According to the invention, such a seat includes a fastening strap, referred to as "top tether" strap, having an anchoring element intended to be attached to an anchoring point provided for this purpose in a vehicle, said "top tether" strap being linked to said seat bottom.

A car seat that is foldable and that is provided with a "top tether" strap has never been proposed. According to the invention, this new approach is furthermore used to provide an effective solution in terms of safety and of control for the installation of this strap. Indeed, the correct installation and/or controlling the correct installation of this "top tether" strap is ensured by the switching of the seat bottom from the folded position to the unfolded position.

According to a particular embodiment, the car seat comprises means for controlling the correct installation of said "top tether" strap, taking into account the tension of said "top tether" strap and/or a deployed minimum length of said strap, from said upper portion of the seat back.

These two aspects are important requirements, in terms of safety, and are sometimes complex to control, and users consequently sometimes tend to ignore or neglect. According to the invention, the seat itself implements a control, by making use of its foldable nature.

According to a first aspect, said means for controlling allow for the installation of a child in said seat only if said "top tether" strap has a deployed length from said upper portion of the seat back of at least 200 mm.

It is indeed necessary, and prescribed in the standard, that the strap has to be deployed over such a minimum length. The invention therefore proposes, according to an embodiment, to link the controlling of this aspect to the unfolding of the seat bottom, and/or to the possibility of unfolding.

According to a second aspect, said means for controlling allow for the installation of a child in said seat only if said "top tether" strap is tightened with a level of tension greater than a predetermined threshold.

It is also important that the strap be sufficiently tightened, and it is not always easy, for the user, to tighten the strap and/or to know if the latter is tight enough. Here, once again, according to an embodiment, the controlling of this aspect is linked to the unfolding of the seat bottom, and/or to the possibility of unfolding.

Of course, the two aspects mentioned hereinabove can be combined, or implemented independently of one another, according to the embodiments.

In particular, a seat according to the invention may comprise a mechanism for tensioning said "top tether" strap that is linked to a mechanism for unfolding said seat bottom.

In this case, it is the unfolding itself, i.e. the displacement of the seat bottom, that simultaneously provides the tensioning, without the user having to take care of this operation: it is sufficient to displace the seat bottom for a sufficient tension to be applied: the seat bottom applies in fact an overtension, with respect to that applied by the user when the user fastened the hook of the strap.

For example, the switching from the folded position to the unfolded position actuates means for tensioning said "top tether" strap. Said means for tensioning can in particular implement a ratchet system.

In this latter case, said seat bottom can take on the function of a lever of said ratchet system, during the switching from the folded position to the unfolded position.

According to another approach, the car seat comprises means for blocking, that prohibit the switching from the folded position to the unfolded position, if said "top tether" strap is not tightened with a level of tension greater than said predetermined threshold.

In this case, it is necessary to tighten the strap sufficiently, before being able to unfold the seat. Cases of incorrect use (misuse) are thus prevented, since it is not possible to unfold the seat bottom, and therefore to install a child, if the strap is not sufficiently tightened.

In this case, said means for blocking can for example comprise a connecting rod which is rotatable about a pivot shaft, having a first end in and/or along which circulates said "top tether" strap and a second end forming and/or controlling an element for blocking in rotation said seat bottom, in such a way as to maintain it in its folded position when said "top tether" strap is not tightened with a level of tension greater than said predetermined threshold.

In particular, said second end of the connecting rod can form or carry an abutment that cooperates with a cam integral with said seat bottom.

According to alternative embodiments, said pivot shaft is mounted on a crosspiece of said seat back or on said seat bottom.

The invention also relates to a method for installing a child car seat, comprising a seat bottom and a seat back that can have a folded position, in which said seat bottom is brought back against said seat back, in order to form a compact unit, and an unfolded position, in which a child can be installed in said seat, a fastening strap, referred to as "top tether" strap, allowing for the attachment of an upper portion of the seat back of said seat to an anchoring point provided for this purpose in a vehicle.

According to the invention, such a method comprises in particular the following steps:
  positioning the seat back of the car seat against the seat back of a vehicle seat, said car seat being in said folded position;
  attaching of the free end of said top tether strap to the anchoring point provided for this purpose in the vehicle;
  controlling the tension and/or the deployed length of said top tether strap;
  switching to said unfolded position of the seat, if said control is positive.

As such, according to the invention, it is the seat bottom that provides, or at least participates in the controlling, with the strap being, directly or indirectly, linked to the seat bottom and to its displacement.

According to a particular approach, the method comprises a step of tensioning jointly with the step of switching from the folded position to the unfolded position, with the displacement of the seat bottom with respect to the seat back providing the tensioning.

Moreover, the method can comprise the prior steps of:
  deploying two fastening clips from a storage position, in housings provided for this purpose in said seat back;
  attaching said clips to rings provided for this purpose in the vehicle, said seat being in the folded position.

LIST OF FIGURES

Figure 2:
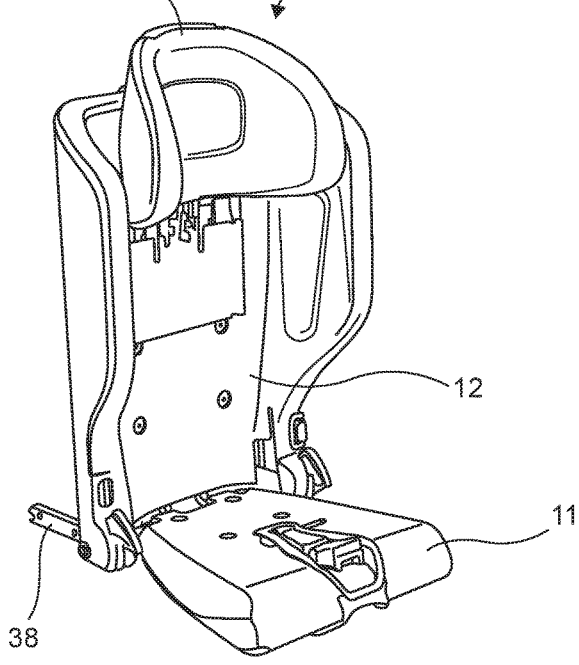
Figure 4:
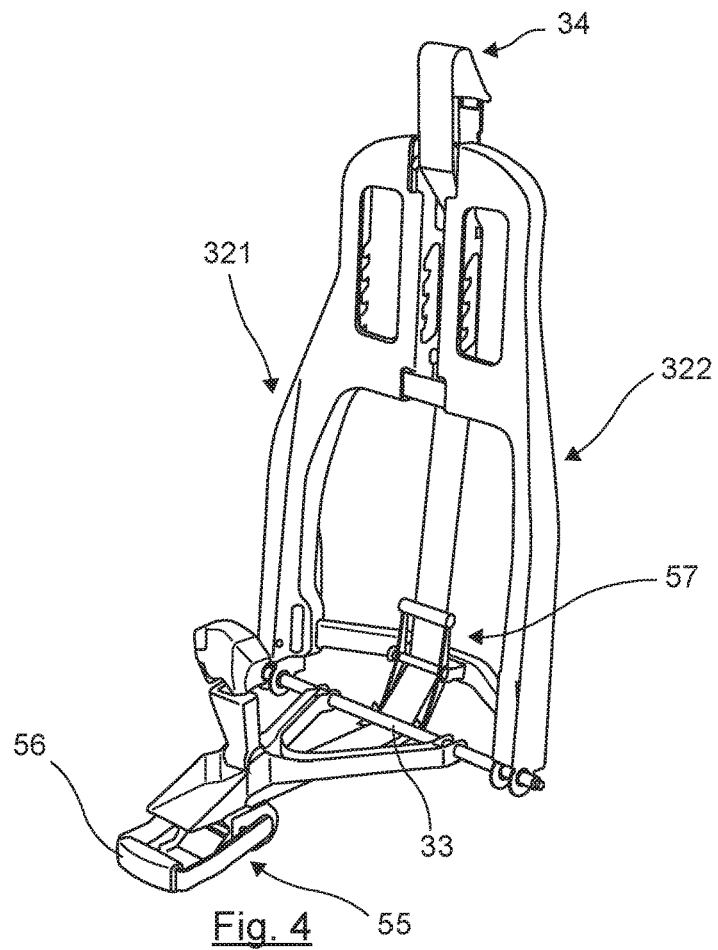
Figure 5:
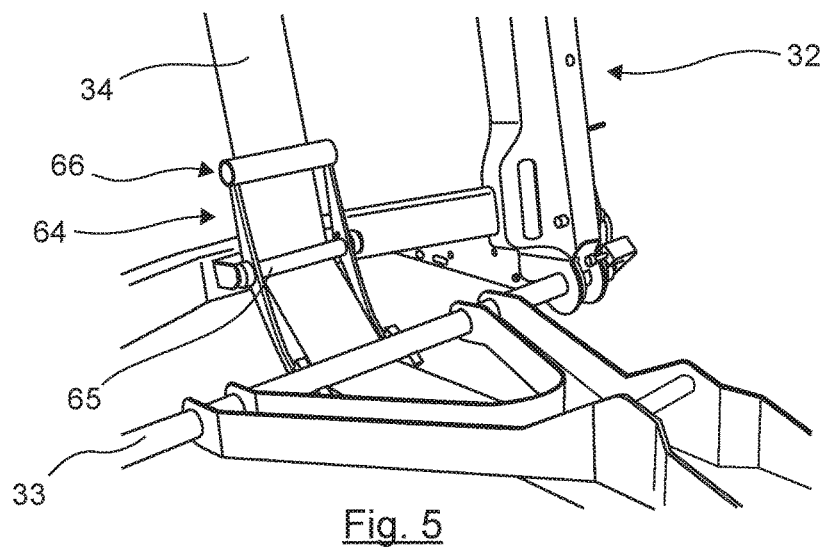
Figure 6:
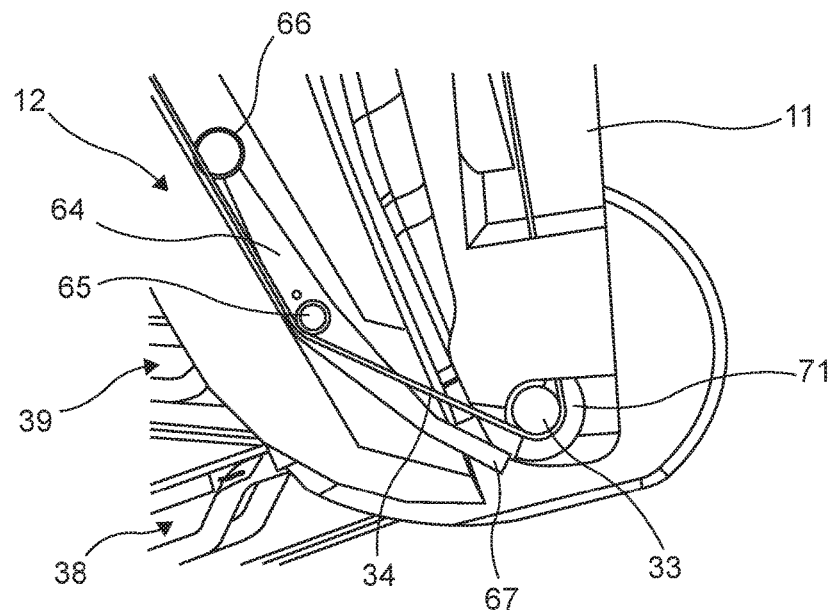
Figure 7:
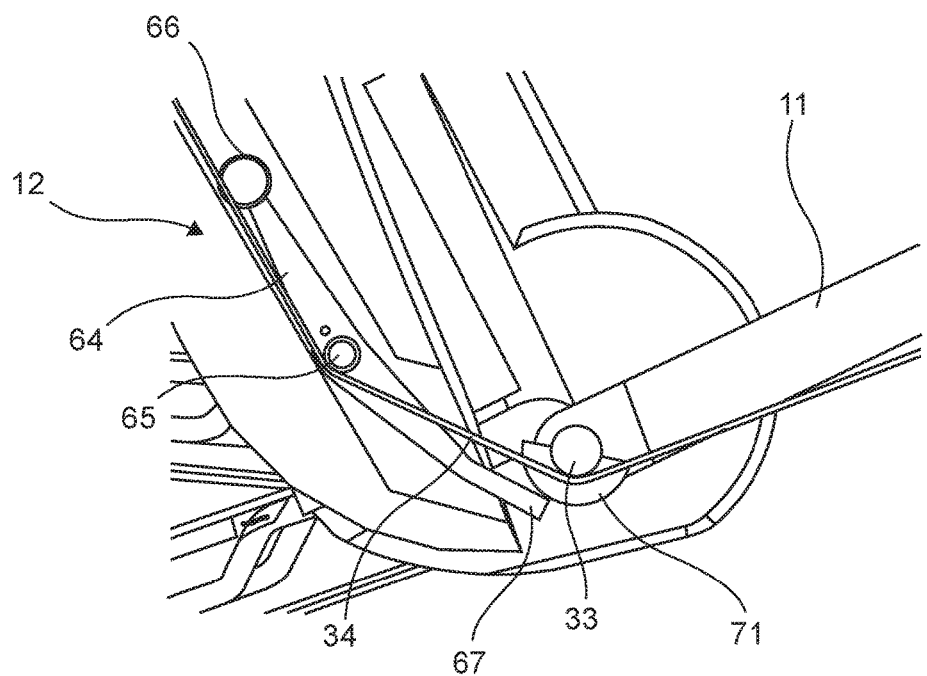
Figure 8:
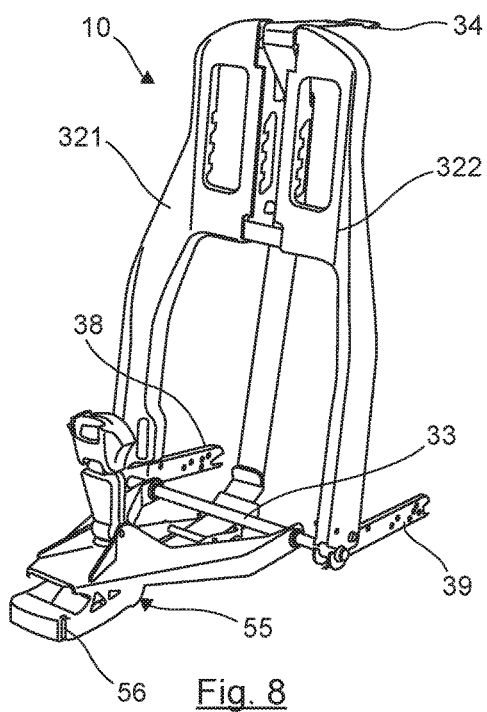
Figure 9A:
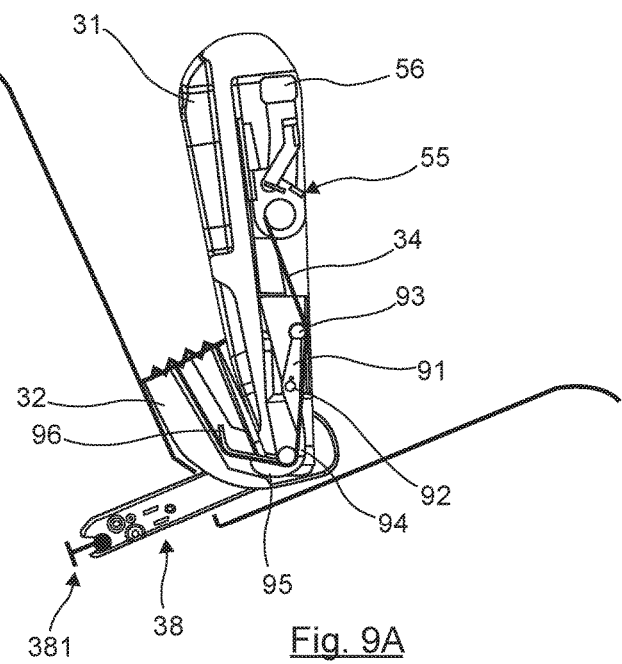
Figure 9B:
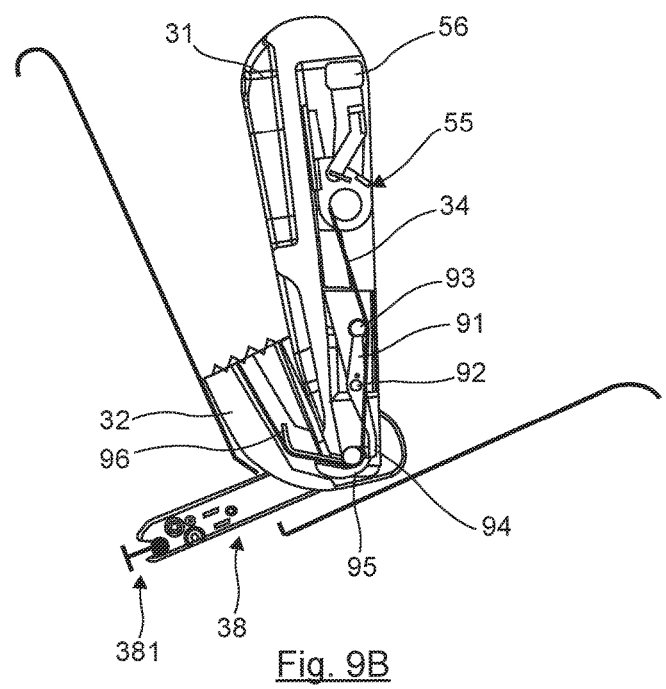
Figure 9C:
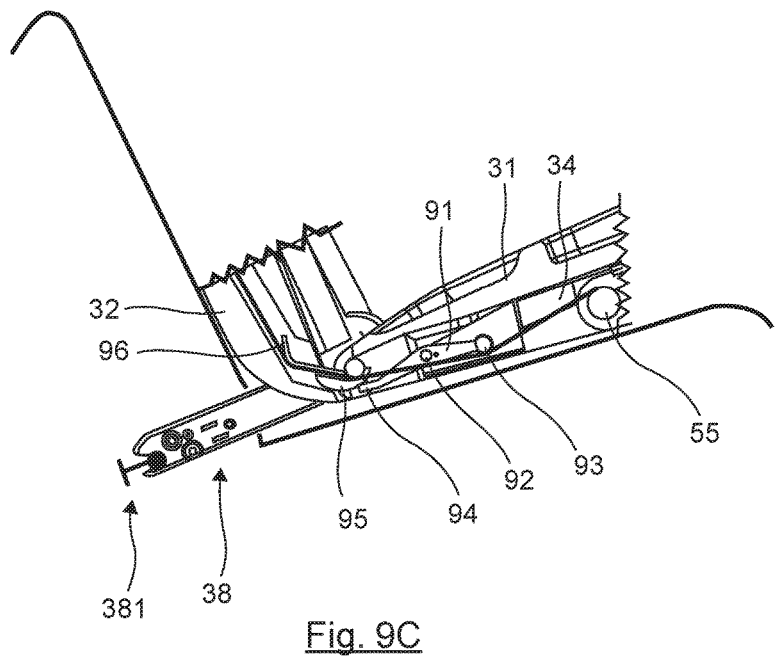

Other purposes, characteristics and advantages of the invention shall appear more clearly in the following description given as an illustrative and non-limiting example and which refers to the annexed figures, wherein:
  FIG. 1 shows a foldable child car seat in a folded position, wherein the seat bottom is folded against the seat back;
  FIG. 2 shows a foldable child car seat in an unfolded position, wherein the seat bottom is unfolded in such a way as to allow the installation of a child;
  FIGS. 3A, 3B, 3C and 3D are planar (FIG. 3A) and perspective (FIGS. 3B, 3C and 3D) views of a system for unlocking ISOFIX clips;
  FIG. 4 is a perspective view of the structure of the foldable child car seat of FIG. 2 comprising a safety system according to a first embodiment;
  FIG. 5 is a perspective view of the safety system according to the first embodiment;
  FIG. 6 is a diagrammatical side view of the safety system according to the first embodiment, with the seat bottom blocked in rotation;
  FIG. 7 is a schematic view of the safety system according to the first embodiment, the seat bottom being free to rotate;
  FIG. 8 is a perspective view of the structure of a foldable child car seat comprising a safety system according to a second embodiment;
  FIGS. 9A, 9B and 9C each show a partial cross-sectional view of the safety system according to the second embodiment, in three successive positions;

DETAILED DESCRIPTION OF EMBODIMENTS OF THE INVENTION

General Principle

The general principle of the invention is based on a foldable child car seat comprising a safety system that controls the correct installation of the "top tether" strap, in such a way as to prevent a child from being installed and transported when this strap is not installed or is incorrectly installed.

The control can in particular focus on one of the following two aspects: sufficient tension of the strap, with respect to a predetermined minimum tension threshold, or a minimum strap length (for example 200 mm) deployed from the upper portion of the seat back. It can also be prescribed that both of these two safety criteria shall be complied with.

According to the invention, the switching towards the unfolded position, wherein the child can be installed, is possible only if this control is positive. According to the embodiments, various means are provided in order to carry out this control. In an alternative, it is the unfolding that provides the tensioning and/or the deployment of a sufficient length. The control is then implicit, since the unfolding itself provides the compliance with the safety criterion or criteria.

Note here that the term "unfolded position" refers to a "complete" unfolded position, wherein the installation of the child is possible (the seat bottom of the seat resting on the seat bottom of the vehicle and the seat back of the seat leaning against the seat back of the vehicle). "Intermediate" unfolding positions are possible when the safety criterion or criteria are not satisfied, in particular when the displacement of the seat bottom provides for the implementation thereof.

FIG. 1 shows an example of a foldable child car seat 10 in folded position, wherein the seat bottom 11 is folded back against the seat back 12, in particular so as to minimise the volume of the seat 10 during its transport. It can also be noted that this folded position can facilitate the setting up of ISOFIX clips, as the access to the rings of the vehicle are not masked by the seat back.

The seat back 12 has lateral flanks 121, 122 which define, together with the rear portion 123 of the seat back, a housing wherein is inscribed on the one hand the seat bottom 11, in the folded position, and on the other hand a headrest 13. This headrest can be adjustable in height (see FIG. 2), for example using a conventional rack-and-pinion mechanism. It is sized here in such a way that, at least when it is in its low position, it is fully housed within the space defined by the elements of the seat back. The assembly is as such particularly compact, in folded position.

Of course, the various parts (seat back, seat bottom and headrest in particular) are intended to be covered with a finishing and/or protective stuffing material.

The seat bottom 11 further carries an idler tensioner, commented hereinafter.

FIG. 2 shows the seat 10 in the unfolded position, wherein the seat bottom is deployed by rotation about an axis of rotation 33 (FIG. 3) in a position that allows a child to be installed.

Two connection clips 38, 39, for example of the ISOFIX type make it possible to attach the car seat to anchoring points provided for this purpose in the bench seat of the motor vehicle.

According to the invention, such a seat is therefore provided with a "top tether" strap 34, which makes it possible to counter a displacement in rotation of the seat around the ISOFIX clips, in case of a strong deceleration. The invention allows for a control of the correct installation of this "top tether" strap, using the seat bottom, and in particular its movable nature with respect to the seat back.

This control comprises at least one of the following aspects: the control of a minimum deployed length of the "top tether" strap and the control of a sufficient tension of the latter, with respect to a predetermined threshold.

According to the embodiments, the seat bottom provides this control, as the displacement of the latter from a folded position to an unfolded position is possible only if the control or controls are positive, or provides at least partially the operation required for deploying a strap length and/or tension of the latter, during the switching from the folded position to the unfolded position.

Thus, in all cases, the "top tether" strap is linked to the seat bottom, and the invention uses the mobility of the latter with respect to the seat back in order to guarantee compliance with at least one safety condition (minimum length and/or tension).

Particular Embodiment for Implementing ISOFIX Clips

According to an embodiment, these clips 38, 39 are rotatably mounted around the axis of rotation 33, independently of one another.

These clips can be stored, when they are not being used, in locations (not shown) provided for this purpose in the low end of the risers 321, 322 of the seat back structure.

In their position of use, the clips 38, 39 are connected to the anchoring elements of the vehicle, while still remaining mobile in rotation with respect to the risers of the seat back. These independent movements allow, in case of impact, for a better dissipation of the energy, in particular in cooperation with the shape of the structure of the seat back and of the seat bottom.

More precisely, in this embodiment, the connection clips 38, 39, for example of the ISOFIX type, make it possible to attach the car seat to anchoring points provided for this purpose in the bench seat of the motor vehicle. These clips are mounted around the axis of rotation of the seat bottom with respect to the seat back, in locations provided for this purpose in the low end of the risers 321, 322 of the seat back structure. These locations have an inverted U-shaped profile and are pierced laterally with holes suited for receiving the axis of rotation of the seat bottom and of the clips.

The clips 38, 39 have an anchoring hook 311 that connects to the anchoring elements provided in the vehicle, with this hook being mobile in rotation with respect to the clip body. The upper portion of the hook 311 is linked to a spring 312, itself linked to a fork 313 mobile in translation.

In their position of use, the clips 38, 39 are connected to the anchoring elements of the vehicle, while still remaining mobile in rotation with respect to the risers 321, 322 of the seat back. This allows for the dissipation of the energy.

A system for unlocking is provided in the low end of each one of the risers 321, 322 of the seat back structure, as shown in FIGS. 3A to 3D. This system comprises:

a control for unlocking comprising an arm 41, a first end of which, oriented towards the top of the riser, is provided with a block 42, and a second end of which, oriented towards the bottom of the riser, comprises a free portion 43. This arm 41 is linked in rotation to the riser 321 via a pivot connection 44;

a spring 50 comprising two rods 51, 52, with a first rod 51 being connected to the first end of the arm of the control for unlocking, with a second rod 52 being fixed to the riser 321 of the seat back structure;

a locking indicator 60, mounted through a cylindrical joint on the axis of the spring at a first of its ends, and provided with a rod 61 at a second of its ends. This rod 61 is pivotably connected with the fork 313 controlling the rotation of the anchoring hook 311 of the clip 39, via the spring 312.

Figure 3A:
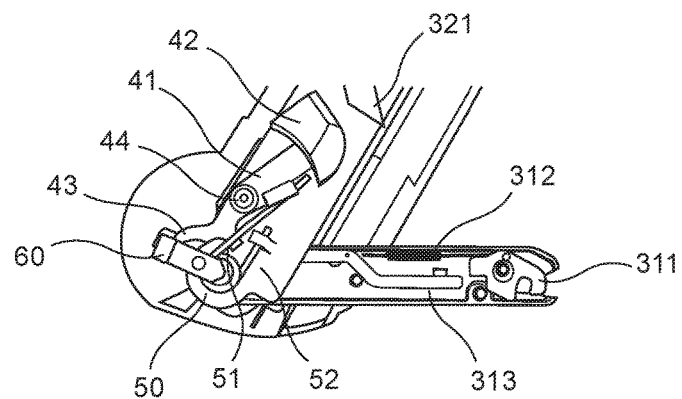
Figure 3B:
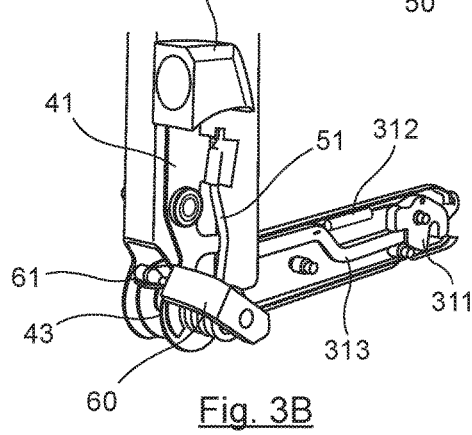
Figure 3C:
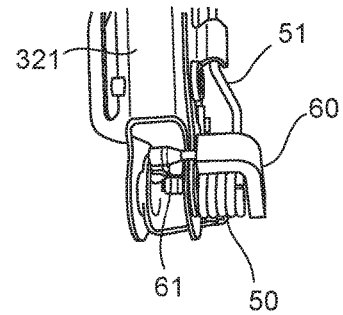
Figure 3D:
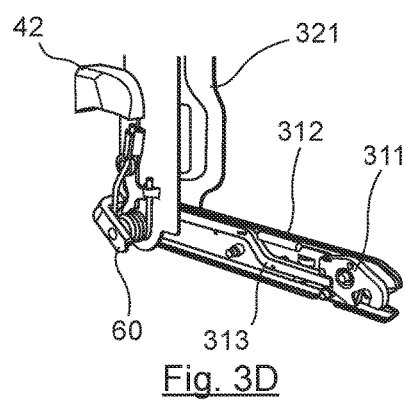

The operation of the system is therefore as follows: in position of use, the clips 38, 39 are fastened to the anchoring points of the vehicle, with the controls for unlocking being aligned vertically with the risers 321, 322, as shown in FIGS. 3B, 3C and 3D. When a user wants to unlock the clips 38, 39 in order to move the car seat for example, the user acts on the block 42 and as such lowers the arm 41 of the control for unlocking. The arm 41, in rotation with respect to the riser 321, actuates the locking indicator 60 via its free portion 43. The indicator 60, through its motion, acts in turn on the fork 313, which acts on the spring 312 through its translation, which pivots the anchoring hook 311 upwards. The clips can then be removed from the anchoring locations of the vehicle.

The arm 41 of the control for locking, as it is lowered, exerts a force on the first rod 51 of the spring 50, the latter being maintained fixedly with respect to the riser 321 of the seat back thanks to its second rod 52. Thus, the arm 41 naturally returns to its initial position when the user releases the pressure.

These clips can be folded back up then maintained in position in housings provided at the rear of the seat back of the seat. This characteristic makes it possible to limit the volume of the seat when it is not in use, and as such facilitate its transport and storage.

This method for storing clips, and the fact that they can be deployed independently of one another, facilitates the installation, in particular in the case of a foldable seat (for which the installation of the clips is carried out when the seat is still folded).

The axis of rotation 33 provides the connection between the seat bottom and the seat back of the seat and the mobility in rotation with respect to one another. In particular, it makes it possible to displace the seat bottom 11 in rotation with respect to the seat back 12.

Note that this particular solution of ISOFIX clips can, entirely or partially, be implemented on other types of car seats, in particular on non-foldable car seats.

First Approach

According to a first approach, specific means for controlling are provided in order to allow the unfolding of the seat only when the safety criterion or criteria are satisfied. As long as this is not the case, the seat bottom cannot be unfolded, and therefore remains substantially parallel to the seat back (or, at the very least, cannot take the unfolded position wherein a child can be installed in the seat).

According to a particular embodiment, the top tether strap acts on a blocking element, mobile between a blocking position (default position, preventing the unfolding of the seat) and an unblocking position (which authorises the unfolding, as soon as the strap is sufficiently tightened.

First Embodiment

FIG. 4 shows the structure of the seat 10 in the unfolded position according to a first embodiment. The structure 32 of the seat back 12 is connected to the structure 31 of the seat bottom 11 via an axis of rotation 33. The "top-tether" strap 34, circulating in the structures of the seat bottom and of the seat back 31, 32, therefore makes it possible to attach the seat 10 to a vehicle by fastening one of its ends to an anchoring point of the vehicle provided for this purpose.

The other end of the "top-tether" strap 34 engages in an idler tensioner with ratchet 55 located below the structure of the seat bottom 31 and which can be actuated via a handle 56 permitting the tensioning of the "top-tether" strap 34. The loosening of the "top tether" strap is carried out via an action on a button for releasing the ratchet or ratchets of the idler tensioner 55. This release button can for example be placed under the seat bottom.

The "top-tether" strap 34 also circulates in a safety system 57 fastened to the structure of the seat back 32.

This safety system 57, as shown in FIG. 5, comprises a connecting rod 64 connected to the structure of the seat back 32 via a pivot 65. The "top-tether" strap 34 extends along the connecting rod 64 and makes contact with the latter at a first end 66 of the connecting rod 64, as well as at the pivot 65. Alternatively, the "top-tether" strap can pass through the end 66 of the connecting rod 64.

As shown in FIGS. 6 and 7, a second end 67 of the connecting rod 64 forms an abutment that cooperates with a cam 71, for example of semi-cylindrical shape, which is located on the axis of rotation 33 and which is fastened either within the seat bottom 11, or directly onto the axis of rotation 33.

Thus, the safety system 57, comprising the connecting rod 64 and the cam 71, makes it possible to block the rotation of the seat bottom 11 in such a way as to prevent the installation of the child as long as the level of tension of the "top-tether" strap 34 does not exceed a predetermined threshold.

At the start of the installation of the seat 10 in the vehicle, the seat bottom 11 is folded back against the seat back 12, and the "top-tether" strap 34 is not yet tensioned. The seat 10 is then locked in the folded position via the end 67 of the connecting rod 64 that abuts against the cam 71, and as such prevents the rotation of the seat bottom 11 around the axis of rotation 33.

This abutment of the end 67 against the cam 71 can for example come from an imbalance on the pivot connection 65 which is primarily created by the difference in weight and/or shape between the first and second ends 66, 67 of the connecting rod 64. As such, in the absence of external constraints, the connecting rod 64 naturally tends to pivot towards its rest position in which the end 67 is in abutment against the cam 71. Where applicable, a return spring on pivot 65 can be provided in order to bias the connecting rod 64 towards adopting the rest position, as long as the tension is not sufficient.

During the installation of the seat 10 (still folded) in the vehicle, the "top-tether" strap 34 is fastened to the vehicle then tensioned thanks to the handle 56 connected to the tensioner with ratchet 55. Beyond a predetermined threshold (corresponding to a tension that is sufficient in terms of safety), the level of tension of the "top-tether" strap 34 is such that it now exerts a force that is sufficiently strong on the first end 66 so that the connecting rod 64 may pivot in the direction corresponding to the departure from the abutment position of the second end 67 with respect to the cam 71. The seat bottom 11 is then free to pivot around the axis of rotation 33 towards an unfolded position since, as shown in FIG. 7, the cam 71 is now no longer blocked in rotation by the end 67.

To uninstall the seat 10, the seat bottom 11 must be folded back against the seat back 12 in a folded position that is apt for the transport of the seat 10. In order to lock the seat 10 again in this folded position, the "top-tether" strap 34 must be loosened, via the button acting on the ratchet or ratchets of the idler tensioner 55. This button is placed under the seat bottom, in such a way that it is available only when this seat bottom is folded (it is as such in particular not possible to loosen the strap if a child is installed in the seat).

When the seat bottom is folded back and the level of tension of the "top-tether" strap 34 is less than a predetermined threshold, the force exerted by the strap on the first end 66 of the connecting rod is no longer sufficient to maintain the second end 67 out of its abutment position. The connecting rod 64 then pivots around the pivot 65 in order to return to its rest position in which the second end 67 abuts against the cam 71, thus locking the seat 10 in folded position.

Alternatively, it can be prescribed that the button for unlocking can be accessed when the seat bottom is partially folded back up. The user then unhooks the "top tether" strap from its anchoring point on the vehicle.

Second Embodiment

FIGS. 8 and 9A to 9C show a second embodiment wherein the safety system 90 is mounted on the seat bottom structure 31 rather than on the seat back structure 32. Similarly to the first embodiment described, the "top-tether" strap 34 comes alongside the safety system 90 which comprises a connecting rod 91 mounted on the seat bottom structure via a pivot connection 92. A first end 93 of the connecting rod 91 is not in contact with the "top-tether" strap 34, while a second end 94 forms an abutment that cooperates with a cam 95 mounted on the axis of rotation 33 of the seat bottom structure 31.

The installation of the seat in the vehicle is carried out in several steps. The ISOFIX clips 38, 39 are first deployed (in the embodiments wherein it is specified that they can be retracted, via rotation and/or translation, in the seat back and/or the seat bottom), in order to bring them to a position that allows them to be attached to the rings 381 provided for this purpose in the vehicle. These clips 38, 39 are attached to these rings 381, with the seat being in a folded position, with the seat bottom 11 being placed against the seat back 12, as shown in FIG. 9A (these preliminary steps are similar to those that can be implemented in the other embodiments).

As long as the "top-tether" strap 34 does not have a level of tension greater than a predetermined threshold, the second end 94 of the connecting rod 91 is in abutment against the cam 95, thus blocking the rotation of the seat bottom structure 31 around the axis of rotation 33, as shown in FIG. 9A.

This abutment of the end 94 against the cam 95 can for example come from an imbalance at the pivot connection 92 which is primarily created by the difference in weight and/or shape between the first and second ends 93, 94 of the connecting rod 91. As such, in the absence of external constraints, the connecting rod 91 naturally tends to pivot towards its rest position wherein the second end 94 is in abutment against the cam 95. Alternatively, a return spring on pivot 92 could bias the connecting rod 91 towards adopting an abutment position at its second end 94.

According to a principle similar to that of the first embodiment, the tensioning of the "top-tether" strap 34 beyond a predetermined threshold induces enough force on the first end 93 to pivot the connecting rod 91 in the direction of departure from the abutment position of the second end 94 with respect to the cam 95, as shown in FIG. 9B.

In order to obtain this sufficient tension level, the user acts on an idler tensioner with a ratchet 55, after having of course hooked to a ring provided for this purpose in the vehicle the free end of the "top tether" strap. This idler tensioner with ratchet 55 can be of any type known per se and suited to the situation.

The seat bottom structure 31 can then pivot freely around the axis of rotation 33 in such a way as to adopt an unfolded position allowing for the installation of the child in the seat 10, as shown in FIG. 9C.

Conversely, to uninstall of the seat 10, the seat bottom 11 must be folded back against the seat back 12 in a folded position that is apt for the transport of the seat 10. In order to lock the seat 10 again in this folded position, the "top-tether" strap 34 must be loosened using a button (not shown) for releasing the idler tensioner 55. When the level of tension of the "top-tether" strap 34 is less than a predetermined threshold, the force exerted by the strap 34 on the first end 93 is no longer sufficient to maintain the second end 94 out of its abutment position. The connecting rod 91 then pivots around the pivot 92 to return to its rest position wherein the second end 94 comes in abutment against the cam 95, thus locking the seat 10 in folded position. As indicated hereinabove, this rest position of the connecting rod 91 can be provided by an imbalance or by a biasing force due for example to a return spring at pivot 92.

As shown in FIGS. 9A to 9C, the "top-tether" strap 34 therefore circulates in the structure of the seat back 32 and the seat bottom structure 31 while coming alongside the safety system 90. A deflector 96 is used as a support by the "top tether" strap 34 during its change in direction between the seat back and the seat bottom. One end of the "top-tether" strap engages in an idler tensioner 55 which can be actuated via a handle 56 allowing for the tensioning of the "top-tether" strap 34.

Second Approach

Alternatively, the seat bottom 11 itself can be used as a lever of the tensioner with ratchet. In this case, the seat bottom 11 is not fully maintained against the seat back, as long as the tension is insufficient: the blocker is suited to authorise an intermediate range of rotation (without being able, of course, to reach the fully unfolded position). Several back-and-forth movements of the seat bottom in this range of rotation make it possible to tighten the strap, intuitively.

Third Embodiment

According to a third embodiment, the tensioning of the "top-tether" strap is carried out jointly with the deployment of the seat bottom towards an unfolded position.

To do this, means for tensioning such as a ratchet system are actuated during the switching of the seat bottom from the folded position to the unfolded position. The tensioning and unfolding operations are then joined. A means for controlling beforehand that the top-tether strap has been hooked, with a minimum tension, can however be provided, for example according to one of the conventional techniques.

Fourth Embodiment

Motorised means for tensioning can also be considered, in order to provide a sufficient tension.

Controlling the Deployed Length

A control of a minimum deployment of the top tether strap can also be provided. It is indeed necessary that a length of at least 200 mm be available, from the upper portion of the seat back.

According to an embodiment, when the top tether strap is fully wound (the hook therefore being in contact with the seat back, for example in a housing provided for this purpose), the seat bottom is maintained in the folded position, against the seat back. The user then pulls on the strap, in order to extract the latter, and therefore unwind it from the idler. When a minimum length is extracted, here 200 mm, the seat bottom is released. This detection of a sufficient length can for example be carried out on the idler, by controlling a corresponding number of revolutions.

Then, the hook is fastened to the vehicle, and the strap is tightened, by acting for example on the lever of the tensioner with ratchet, or by the unfolding of the seat bottom.

The invention claimed is:

1. Child car seat comprising a seat bottom and a seat back that can have a folded position, in which the seat bottom is brought back against the seat back, in order to form a compact unit, and an unfolded position, in which a child can be installed in the seat,
   a top tether strap slidably secured to an upper end of the seat back and having an anchoring element intended to be attached to an anchoring point provided for this purpose in a vehicle, the top tether strap being slidably connected to the seat bottom, and a connecting rod pivotally supported on one of the seat back or the seat bottom, the connecting rod engaged by the top tether strap for movement of the connecting rod between a blocking position and a releasing position, wherein in the blocking position the connecting rod lockingly engages with the other of the seat back and the seat bottom and in the releasing position unblocks and allows the seat bottom to unfold relative to the seat back.

2. Child car seat according to claim 1, further comprising control means comprising the connecting rod for controlling the correct installation of the top tether strap, taking into account a tension of said top tether strap.

3. Child car seat according to any of claim 2, wherein the control means allows for the installation of a child in the child car seat only if the top tether strap is tightened with a level of tension greater than a predetermined threshold.

4. Child car seat according to claim 3, further comprising a mechanism for tensioning the top tether strap linked to a mechanism for unfolding the seat bottom wherein the mechanism for unfolding also includes the connecting rod.

5. Child car seat according to claim 3, further comprising means for blocking switching of the seat back from the folded position to the unfolded position if the top tether strap is not tightened with a level of tension greater than said predetermined threshold wherein the means for blocking also includes the connecting rod.

6. Child car seat according to claim 5, wherein the connecting rod is mobile in rotation around a pivot shaft the connecting rod having a first end at least one of in or along which circulates the top tether strap and a second end at least one of forming or controlling an element for blocking in rotation the seat bottom relative to the seat back, in a way that maintains the seat back in its folded position when the top tether strap is not tightened with a level of tension greater than said predetermined threshold.

7. Child car seat according to claim 6, wherein the second end of the connecting rod forms or carries an abutment that cooperates with a cam integral with the seat bottom.

8. Child car seat according to claim 6, wherein the pivot shaft is mounted on a crosspiece of the seat back.

9. Child car seat according to claim 7, characterised in that the pivot shaft is mounted on the seat bottom.

10. Method for installing a child car seat comprising a seat bottom, a seat back, in which the seat bottom is brought back against said seat back into a folded position, in order to form a compact unit, and an unfolded position, wherein a child can be installed in said seat, a top tether strap slidably secured to an upper end of the seat back and allowing for the attachment of an upper portion of the seat back of the child car seat with an anchoring point provided for this purpose in a vehicle, and a connecting rod pivotally supported on one of the seat back and the seat bottom, the method comprising the steps of positioning the seat back of the child car seat against a seat back of a vehicle seat, the child car seat being in the folded position;

attaching a free end of the top tether strap to the anchoring point provided for this purpose in the vehicle;

pivoting the connecting rod from a blocking position to an unblocking position by controlling at least one of the tension or the deployed length of the top tether strap; and switching towards the unfolded position of the child car seat if the control is positive.

11. Method for installing according to any of claim 10, further comprising the prior steps of:

deploying two fastening clips from a storage position, in housings provided for this purpose in the seat back;

attaching the clips to rings provided for this purpose in the vehicle, the child car seat being in the folded position.

\* \* \* \* \*